United States Patent
Tu et al.

(10) Patent No.: US 9,462,251 B2
(45) Date of Patent: Oct. 4, 2016

(54) DEPTH MAP ALIGNING METHOD AND SYSTEM

(71) Applicant: INDUSTRIAL TECHNOLOGY RESEARCH INSTITUTE, Hsinchu (TW)

(72) Inventors: Jih-Sheng Tu, Yilan County (TW); Jung-Yang Kao, Pingtung County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 433 days.

(21) Appl. No.: 14/189,258

(22) Filed: Feb. 25, 2014

(65) Prior Publication Data
US 2015/0189253 A1 Jul. 2, 2015

(30) Foreign Application Priority Data
Jan. 2, 2014 (TW) .............................. 103100008 A (51) Int. Cl.
H04N 13/00 (2006.01)
G06T 3/00 (2006.01)
G06T 5/00 (2006.01)

(52) U.S. Cl.
CPC ......... *H04N 13/0011* (2013.01); *G06T 3/0068* (2013.01); *G06T 5/005* (2013.01); *H04N 13/0018* (2013.01); *G06T 2207/10012* (2013.01); *G06T 2207/10028* (2013.01); *H04N 13/0022* (2013.01)

(58) Field of Classification Search
None
See application file for complete search history.

(56) References Cited

U.S. PATENT DOCUMENTS

| | | | |
|---|---|---|---|
| 6,714,665 | B1 | 3/2004 | Hanna et al. |
| 6,865,289 | B1 | 3/2005 | Berestov |
| 7,024,054 | B2 | 4/2006 | Cahill et al. |
| 7,616,885 | B2 | 11/2009 | Chen et al. |
| 7,783,403 | B2 | 8/2010 | Breed |
| 8,160,149 | B2 | 4/2012 | Demos |
| 8,300,089 | B2 | 10/2012 | Robinson |
| 8,326,025 | B2 | 12/2012 | Boughorbel |
| 8,345,930 | B2 | 1/2013 | Tamrakar et al. |
| 8,368,696 | B2 | 2/2013 | Daly et al. |

(Continued)

FOREIGN PATENT DOCUMENTS

| | | |
|---|---|---|
| CN | 1745589 A | 3/2006 |
| CN | 101374243 A | 2/2009 |

(Continued)

OTHER PUBLICATIONS

Office Action issued by TIPO on Sep. 17, 2015.

(Continued)

*Primary Examiner* — Heather Jones
(74) *Attorney, Agent, or Firm* — Rabin & Berdo, P.C.

(57) ABSTRACT

A depth map aligning method and a system are provided. The depth map aligning method includes the following steps. A view warping is performed to a left-view image and a right-view image of a real-view image according to a corresponding depth map to obtain a right-virtual view image, a left hole information, and a right hole information thereof. A residual difference of pixel, which is not a hole, is obtained by pixel to pixel. If the residual difference of the pixel is larger than a first threshold value, a reverse warping is performed to obtain a coordinate of the pixel. The depth value of the pixel is aligned according to the depth value of one or more pixels in a vicinity of the obtained coordinate.

26 Claims, 6 Drawing Sheets

(56) References Cited

U.S. PATENT DOCUMENTS

| | | | |
|---|---|---|---|
| 8,411,932 | B2 | 4/2013 | Liu et al. |
| 2011/0261050 | A1* | 10/2011 | Smolic ............... G06T 15/20 345/419 |
| 2011/0279697 | A1 | 11/2011 | Shingu et al. |
| 2011/0292043 | A1 | 12/2011 | Kim et al. |
| 2012/0026301 | A1 | 2/2012 | Lee et al. |
| 2012/0155830 | A1 | 6/2012 | Sasaki et al. |
| 2012/0162395 | A1 | 6/2012 | Ho et al. |
| 2012/0206440 | A1 | 8/2012 | Tian et al. |
| 2012/0230603 | A1* | 9/2012 | Lee ..................... G06T 5/005 382/275 |
| 2012/0242789 | A1 | 9/2012 | Cheng et al. |
| 2012/0280976 | A1 | 11/2012 | Chen |
| 2012/0281906 | A1 | 11/2012 | Appia |
| 2012/0327077 | A1 | 12/2012 | Tung |
| 2013/0010073 | A1 | 1/2013 | Do et al. |
| 2013/0038694 | A1 | 2/2013 | Nichani et al. |
| 2013/0070060 | A1 | 3/2013 | Chatterjee et al. |
| 2013/0101160 | A1 | 4/2013 | Woodfill et al. |
| 2013/0124951 | A1 | 5/2013 | Shechtman et al. |
| 2014/0293028 | A1* | 10/2014 | Nguyen ............ H04N 13/0011 348/59 |
| 2014/0313290 | A1* | 10/2014 | Tech ................... G06T 15/205 348/43 |
| 2015/0215600 | A1* | 7/2015 | Norkin ............. H04N 13/0011 348/43 |
| 2015/0341614 | A1* | 11/2015 | Senoh ................ H04N 19/597 348/43 |

FOREIGN PATENT DOCUMENTS

| | | |
|---|---|---|
| CN | 101566784 A | 10/2009 |
| CN | 101630408 A | 1/2010 |
| CN | 101640809 A | 2/2010 |
| CN | 101771893 A | 7/2010 |
| CN | 101925923 A | 12/2010 |
| CN | 102307307 A | 1/2012 |
| CN | 102625127 A | 8/2012 |
| CN | 102760234 A | 10/2012 |
| CN | 102186095 B | 12/2012 |
| CN | 102957923 A | 3/2013 |
| CN | 103220543 A | 7/2013 |
| EP | 1413148 A1 | 4/2004 |
| EP | 1796048 A2 | 6/2007 |
| EP | 2050067 A1 | 4/2009 |
| EP | 2058761 A2 | 5/2009 |
| EP | 2319246 A2 | 5/2011 |
| EP | 2362670 A1 | 8/2011 |
| EP | 2395766 A2 | 12/2011 |
| EP | 2395771 A1 | 12/2011 |
| EP | 2400774 A1 | 12/2011 |
| EP | 2403259 A1 | 1/2012 |
| EP | 2416581 A2 | 2/2012 |
| EP | 2434769 A1 | 3/2012 |
| EP | 2453661 A1 | 5/2012 |
| EP | 2482563 A1 | 8/2012 |
| JP | 04020434 B2 | 12/2007 |
| JP | 04201711 B2 | 12/2008 |
| JP | 2012-194751 A | 10/2012 |
| TW | 200816800 A | 4/2008 |
| TW | 201003569 A | 1/2010 |
| TW | I423666 B | 1/2014 |
| WO | WO-98/47061 A2 | 10/1998 |
| WO | WO-2012047917 A1 | 4/2012 |
| WO | WO-2012089595 A1 | 7/2012 |
| WO | WO-2012096530 A2 | 7/2012 |
| WO | WO-2012121052 A1 | 9/2012 |
| WO | WO-2012147621 A1 | 11/2012 |
| WO | WO-2012153513 A1 | 11/2012 |
| WO | WO-2013025530 A1 | 2/2013 |
| WO | WO-2013062944 A1 | 5/2013 |
| WO | WO-2013067441 A1 | 5/2013 |
| WO | WO-2013148308 A1 | 10/2013 |

OTHER PUBLICATIONS

Chung-Te Li et al., "3D Image Correction by Hilbert Huang Decomposition" 2012 IEEE International Conference on Consumer Electronics (ICCE), pp. 271-272, Jan. 2012.

Mashhour Solh et al., "3VQM: A Vision-Based Quality Measure for DIBR-Based 3D Videos" 2011 IEEE International Conference on Multimedia and Expo (ICME), pp. 1-6, Jul. 2011.

Hsin-Chia Shih et al., "A Depth Refinement Algorithm for Multi-View Video Synthesis" 2010 IEEE International Conference on Acoustics Speech and Signal Processing (ICASSP), pp. 742-745, Mar. 2010.

Jin Young Lee et al., "A Fast and Efficient Multi-View Depth Image Coding Method Based on Temporal and Inter-View Correlations of Texture Images" IEEE Transactions on Circuits and Systems for Video Technology, vol. 21, Issue 12, pp. 1859-1868, Dec. 2011.

Xuyuan Xu et al., "A Foreground Biased Depth Map Refinement Method for DIBR View Synthesis" 2012 IEEE International Conference on Acoustics, Speech and Signal Processing (ICASSP), pp. 805-808, Mar. 2012.

Mashhour Solh et al., "A No-Reference Quality Measure for DIBR-Based 3D Videos" 2011 IEEE International Conference on Multimedia and Expo (ICME), pp. 1-6, Jul. 2011.

Ya-Mei Feng et al., "Asymmetric Bidirectional View Synthesis for Free Viewpoint and Three-dimensional Video" IEEE Transactions on Consumer Electronics, vol. 55, Issue 4, pp. 2349-2355, Nov. 2009.

Chun-Chi Chen et al., "A Synthesis-Quality-Oriented Depth Refinement Scheme for MPEG Free Viewpoint Television (FTV)" 11th IEEE International Symposium on Multimedia, 2009. ISM'09, pp. 171-178, Dec. 2009.

Yin Zhao et al., "Boundary Artifact Reduction in View Synthesis of 3D Video: From Prespective of Texture-Depth Alignment" IEEE Transactions on Broadcasting, vol. 57, Issue 2, pp. 510-522, Jun. 2011.

Cheon Lee et al., "Boundary Filtering on Synthesized Views of 3D Video" Second International Conference on Future Generation Communication and Networking Symposia, 2008. FGCNS' 08, vol. 3, pp. 15-18, Dec. 2008.

Xiao-han Lu et al., "Foreground-Object-Protected Depth Map Smoothing for DIBR" 2012 IEEE International Conference on Multimedia and Expo (ICME), pp. 339-343, Jul. 2012.

Fabian Jager et al., "Median Trilateral Loop Filter for Depth Map Video Coding" Picture Coding Symposium 2012 (PCS), pp. 61-64, May 2012.

Chinese Office Action dated Jun. 1, 2016.

\* cited by examiner

DEPTH MAP ALIGNING METHOD AND SYSTEM

This application claims the priority benefit of Taiwan application serial no. 103100008, filed on Jan. 2, 2014. The entirety of the above-mentioned patent application is hereby incorporated by reference herein and made a part of this specification.

TECHNICAL FIELD

The technical field is related to a depth map aligning method and system.

BACKGROUND

According to the current 3D Video Coding (3DVC) standard established by the Moving Picture Experts Group (MPEG), it wishes to perform multi-view 3D visual effects under the traffic restriction of current digital transmission environment. Comparing 3DVC with multi-view video coding (MVC), 3DVC do not have to record huge views information and build multiple views by view synthesis to save large amount of data.

The overall structure of 3DVC would like to utilize mainly the so-called "view synthesis" way to synthesize multiple virtual-view images by only using the texture images (real-view image) of few frames and the corresponding depth maps of these few frames within texture images. Take the Depth Image Based Rendering (DIBR) algorithm as an example, DIBR could use three groups (real-view images plus the respective corresponding depth maps) of information, to produce nine different view images that including real-view images and virtual-view images. No matter the audience viewing from which angel, the three-dimensional image can be viewed with just let the left eye and the right eye receive the corresponding view image respectively.

Texture image is a real-view image that camera shots, but the depth map may regard as the corresponding 8 bits grey level image. The pixel values of depth map (between 0 and 255) represent the distance of objects in the scene from the video camera. Depth map show the relationships between objects in the spatial coordinates, which is independent of the actual texture information of the object itself.

For example, if we define texture images: the pixels correspond to larger depth values (lighter in color) will be attributed to the foreground object, and the pixels correspond to smaller depth values (darker in color) will be attributed to the background. It can be simplified to explain, the view synthesis process could be looked as how many distance ran to virtual-view images because of the so-called "view warping" of pixels in the real-view images, and each pixel of texture image warps how many distance is decided by the pixel value of corresponding pixel coordinate of the depth map, which could be called for short as "depth value." Under the doctrine of view synthesis theory, the greater the depth value of the depth map of the corresponding texture image pixel, the larger the pixel warping offset will also be.

During the process of view synthesis, the larger depth value pixels warp more distance and the smaller depth value pixels warp less distance. Because the offsets of warping are different, it may cause the result that there are some pixels in the virtual-view image have no value. We may call these empty pixels—"hole." For example, in general the hole information could be marked as so-called "hole mask" in the corresponding pixel coordinate. The following procedure will then take the hole information as references to process the hole filing algorithm. In general, when comparing the foreground/background regions between textual image and depth map, if the results do not match, some boundary noise will be formed in the synthesized image.

SUMMARY OF THE DISCLOSURE

An exemplary embodiment in accordance of the disclosure provides a depth map aligning method. The aligning method includes at least the following steps. The method performs a view warping to a left-view image and a right-view image of a real-view image according to a corresponding depth map to obtain a left-virtual-view image, a right-virtual-view image, a left hole information, and a right hole information. The aligning method obtains by pixel to pixel a residual difference of at least one pixel, which is not a hole, by subtracting pixel value of the left-virtual-view image and the right-virtual-view image. The aligning method further performs a reverse warping to obtain a coordinate of the at least one pixel in the real-view image, if the residual difference of the at least one pixel is larger than a first threshold value. And the aligning method performs a depth map aligning by correcting a depth value of the at least one pixel according to depth values of one or more pixels in a vicinity of the coordinate obtained.

An exemplary embodiment in accordance of the disclosure provides a depth map aligning system is provided. The aligning system includes at least the following units. The aligning system includes a view warping unit for obtaining a left-virtual-view image, a right-virtual-view image, a left hole information, and a right hole information according to a corresponding depth map, and performing a view warping to a left-view image and a right-view image of a real-view image. The system further includes a residual difference unit for subtracting pixel value of the left-virtual-view image and the right-virtual-view image by pixel to pixel, and obtaining a residual difference of at least one pixel, which is not a hole. When a first decision unit judges that the residual difference of the at least one pixel is larger than a first threshold value, then a reverse warping unit will perform a reverse warping to obtain a coordinate of the at least one pixel in the real-view image. The system also includes a depth map aligning unit for performing a depth map aligning by correcting a depth value of the at least one pixel according to depth values of one or more pixels in a vicinity of the obtained coordinate.

In order to make the aforementioned and other features and advantages of the disclosure comprehensible, several exemplary embodiments accompanied with figures are described in details below.

BRIEF DESCRIPTION OF THE DRAWINGS

The accompanying drawings are included as exemplary embodiments to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

Figure 1A:
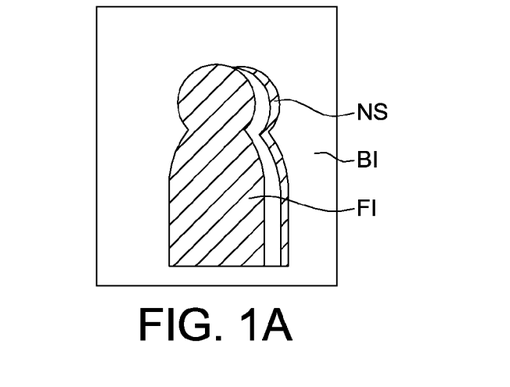
FIGS. 1A, 1B and 1C are schematic diagrams showing the noises may be produced in the edge junctions of foreground object and background.
Figure 1B:
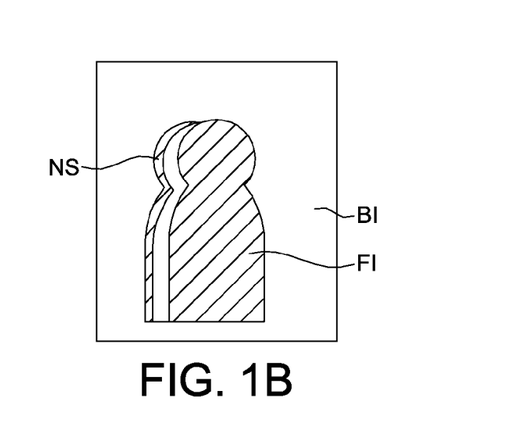
Figure 1C:
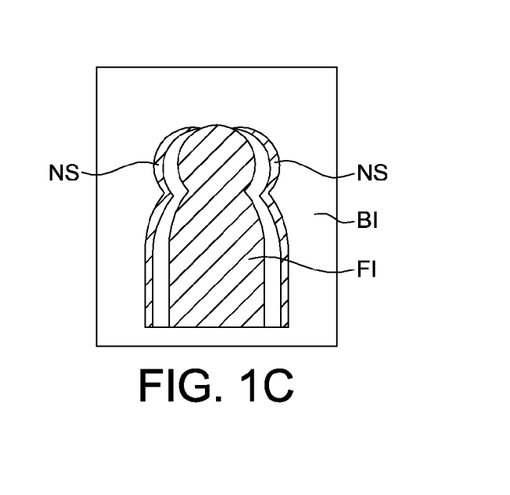

In the video compression method, such as 3D video coding (3DVD) standard, the image quality in some degree depends on correctness of the depth map. In the depth map, the depth information of an object image may not be correct. For example, it is observed that depth value of pixel belonging to the foreground portion could become depth value of background pixel, due to incorrectness of the depth map. On the consequence, this pixel will not be warped to the right place, and will become part of the background. Please refer to FIGS. 1A, 1B and 1C which show that the noises NS may be produced in the edge junctions of foreground object and background. Reflecting to the synthesized virtual-view image, this could make the synthesized virtual image produce noises NS, for example, at the junction edge of foreground object FI and background BI as shown in FIGS. 1A, 1B, and 1C.

Therefore, a depth map aligning method and system are provided. The exemplary embodiments in accordance with the disclosure are compatible with requirements of the current video compression standards H.264/AVC and H.265/HEVC organization.

Figure 2:
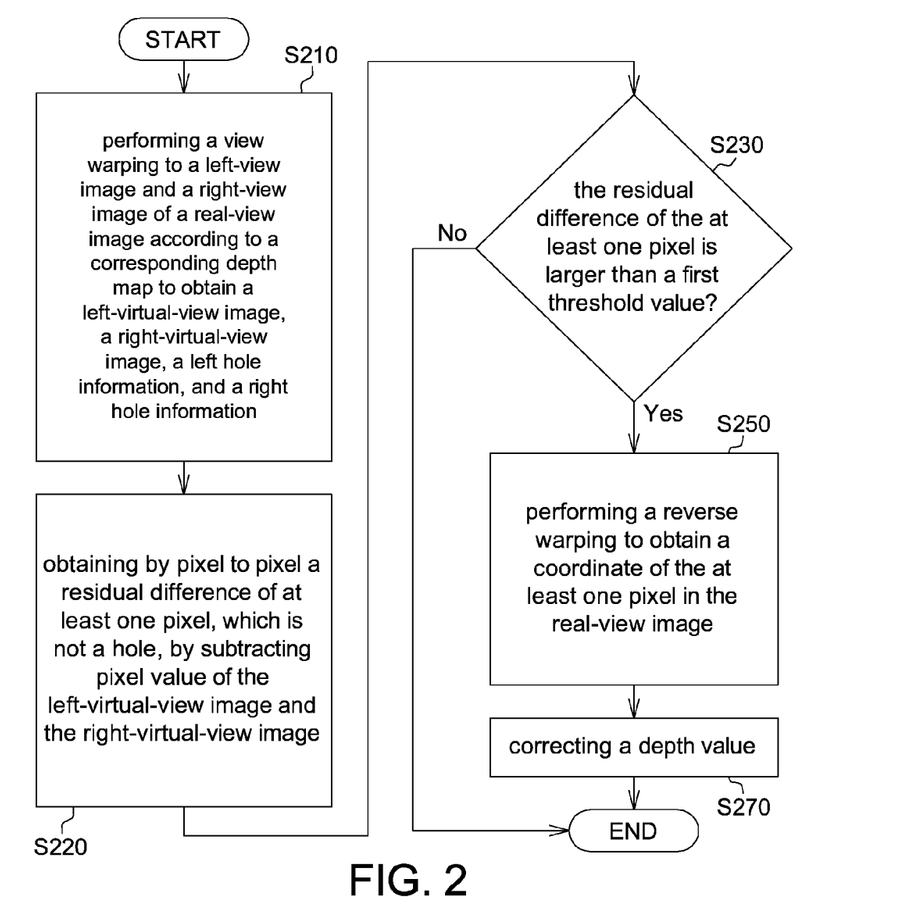
FIG. 2 is a flowchart showing a depth map aligning method according to an exemplary embodiment of the disclosure.
Figure 3:
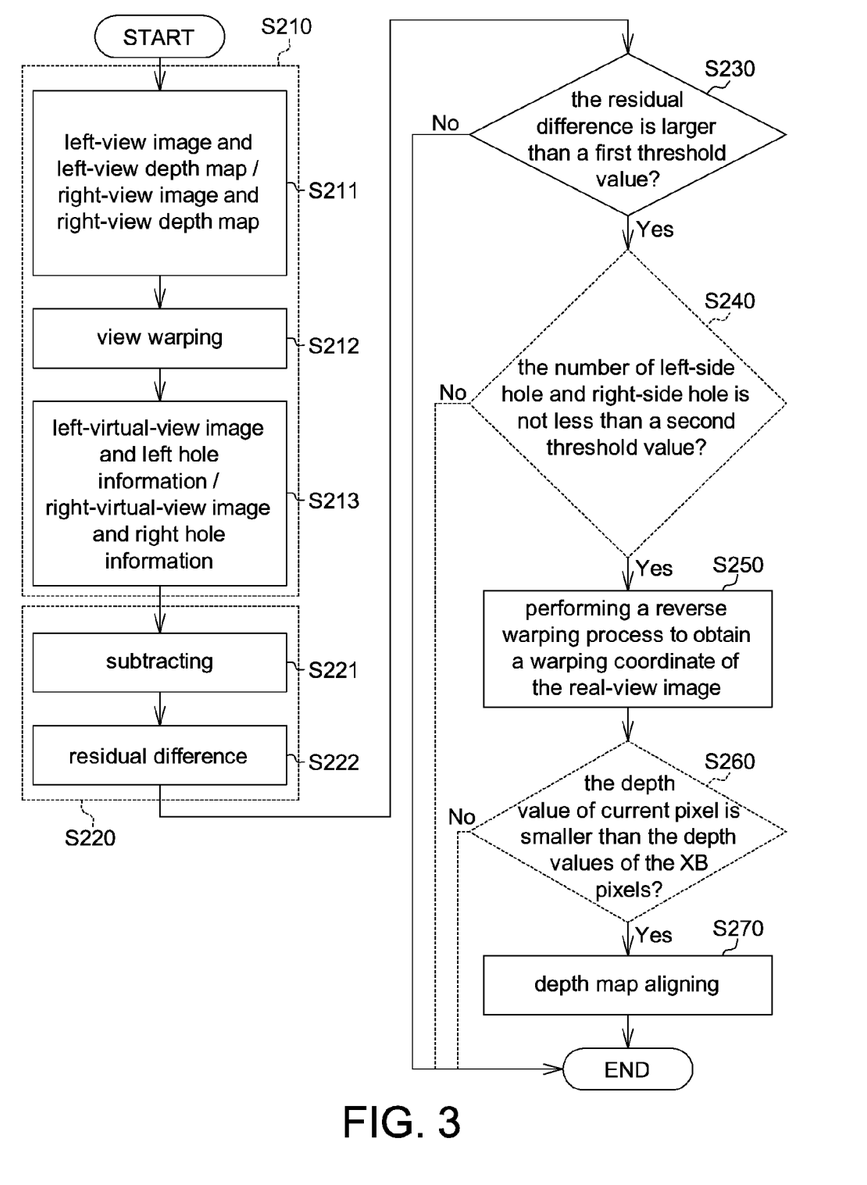
FIG. 3 is another flowchart showing an exemplary embodiment of the depth map aligning method of FIG. 2 in accordance with the disclosure.

Referring to FIG. 2 and FIG. 3, FIG. 2 is a flowchart illustrating an exemplary embodiment of a depth map aligning method in accordance with the disclosure. FIG. 3 is another flowchart showing an exemplary embodiment of the depth map aligning method of FIG. 2 in accordance with the disclosure. In step S210, a view warping is performed to a left-view image and a right-view image of a real-view image according to a corresponding depth map (S211, S212), and a left-virtual-view image, a right-virtual-view image, a left hole information, and a right hole information are obtained (S213). In step S220, the aligning method obtains by pixel to pixel a residual difference of at least one pixel, which is not a hole, by subtracting pixel value of the left-virtual-view image and the right-virtual-view image (S221, S222).

In steps S230, S250, the aligning method further performs a reverse warping process to obtain a coordinate/location of the at least one pixel in the real-view image, if the residual difference of the at least one pixel is larger than a first threshold value. That is to say, if the vicinity of the pixel location has noise(s) (S230), the reverse warping process is performed to estimate from which coordinate of the real-view image the at least one pixel is warped. And in step S270, the aligning method performs a depth map aligning by correcting the depth value of the at least one pixel according to the depth values of one or more pixels in a vicinity of the coordinate(s) obtained. Therefore, the aligned depth map of left-view image and right-view image are obtained.

During the actual implementation, for example in one embodiment, it could perform reverse warping to obtain the coordinate of real-view image before warping process after obtaining all pixels having noise(s) that have the residual difference larger than the first threshold value, and the depth value of the coordinate is aligned. In another embodiment, for example, the process could be performed by pixel per pixel base. After judging a pixel could have noise, a coordinate of real-view image before the warping process is then reversed and the depth value of the coordinate is aligned. The above examples are possible ways of implementation choice and which are not limited in the disclosure. In general, the so-called "vicinity" means within a setting area surrounding a pixel. That is, one or more pixels surround the pixel within a setting distance of any setting direction. The direction could be set, for example in an exemplary embodiment, by horizontal, by diagonal, by vertical direction, or by any angle. The distance range could be set, in an exemplary embodiment, to XB pixels, wherein XB is a positive integer greater than or equal to 1. A statistical analysis could be used to produce an aligned value to replace original depth value of the pixel. For example it can produce, an arithmetic means, a median, or a similar statistical characteristics value, and which is not limited in the disclosure.

Information or data of individual left-virtual-view, right-virtual-view image will be also produced when the left-virtual-view, right-virtual-view image is synthesized. For example, in an exemplary embodiment, it could synthesize the depth map of left-virtual-view &/the depth map of right-virtual-view using the depth map of left-view image &/right-view image respectively, such that performing the reverse warping of pixel(s) has noise in the left-side &/right-side in accordance with the depth map of left-virtual-view &/right-virtual-view respectively. While in another exemplary embodiment, a left lookup table and/or a right lookup table could be used. Lookup tables record how many warping distance be projected from the corresponding left-virtual-view image, right-virtual-view image respectively. When the reverse warping is being performed, it could then refer to the corresponding lookup table(s) to reverse estimate the pixel of virtual-view image is warped from which pixel of real-view image.

Referring to the exemplary embodiment of FIG. 3, when finding at least one pixel that having noise (S230), in an exemplary embodiment, the aligning method could choose to perform step S240 to judge near left-side or near right-side of the found at least one pixel respectively, if the number of hole larger than a second threshold value or not. That is, judging separately if the left-side hole width or the right-side hole width (i.e. the number of hole) of the at least one pixel is larger than the second threshold or not. The left-side and right-side information/data mentioned in FIG. 2 including a number of left-side hole, and a number of right-side hole of the at least one pixel respectively. If a hole width is larger than the second threshold, the reverse warping process will be performed to estimate and obtain a warping coordinate of the real-view image from which this pixel is warped (S250). And step S270 performs a depth map aligning by correcting the depth value of the at least one pixel according to the depth values of one or more pixels in a vicinity of the coordinate obtained.

Figure 4:
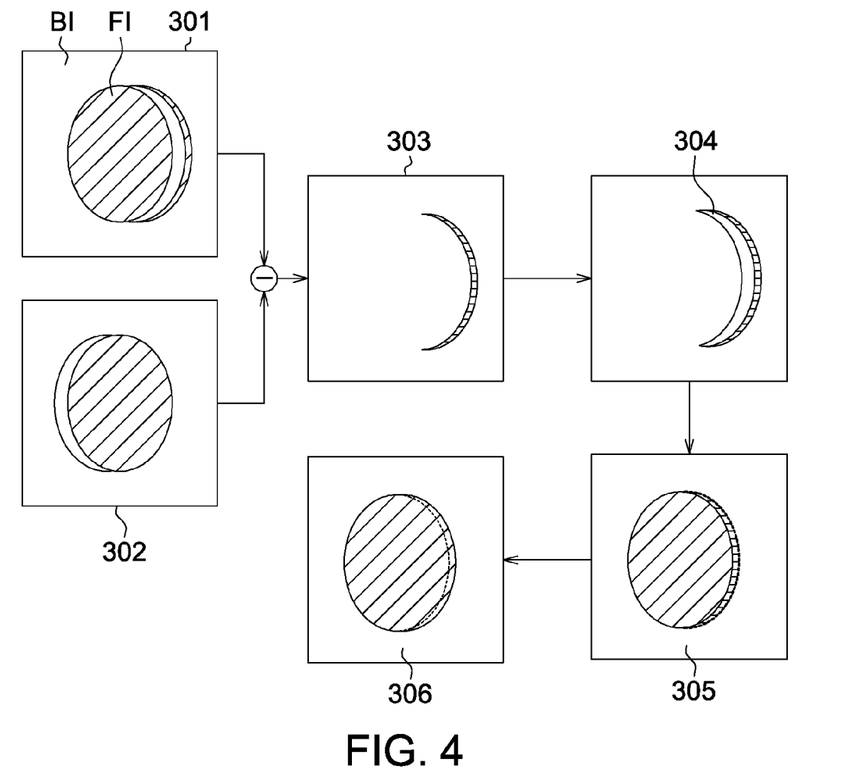
FIG. 4 is a schematic diagram of using the exemplary embodiment method of FIG. 3 to check the left side hole.

FIG. 4 shows a schematic diagram of using the exemplary embodiment method of FIG. 3 to check the left-side hole. A residual difference DiffLRwarp 303 of the at least one pixel is obtained, by pixel to pixel which is not a hole, by subtracting pixel value of the left-virtual-view image 301 and the right-virtual-view image 302, and step 230 finds at least one pixel that having noise. Referring to step S240, when judging that the width of left-side hole 304 of a pixel is larger than the second threshold value during left-side hole checking. The reverse warping of the pixel will be performed according to the information of the left-view image, and will obtain a warping coordinate of the left-view image from which this pixel is warped (S250). In step S270 then obtaining the corrected left-view depth map 306, by aligning depth value of the pixel according to the depth value of one or more pixels of the left vicinity of the coordinate from the left-view depth map 305.

Figure 5:
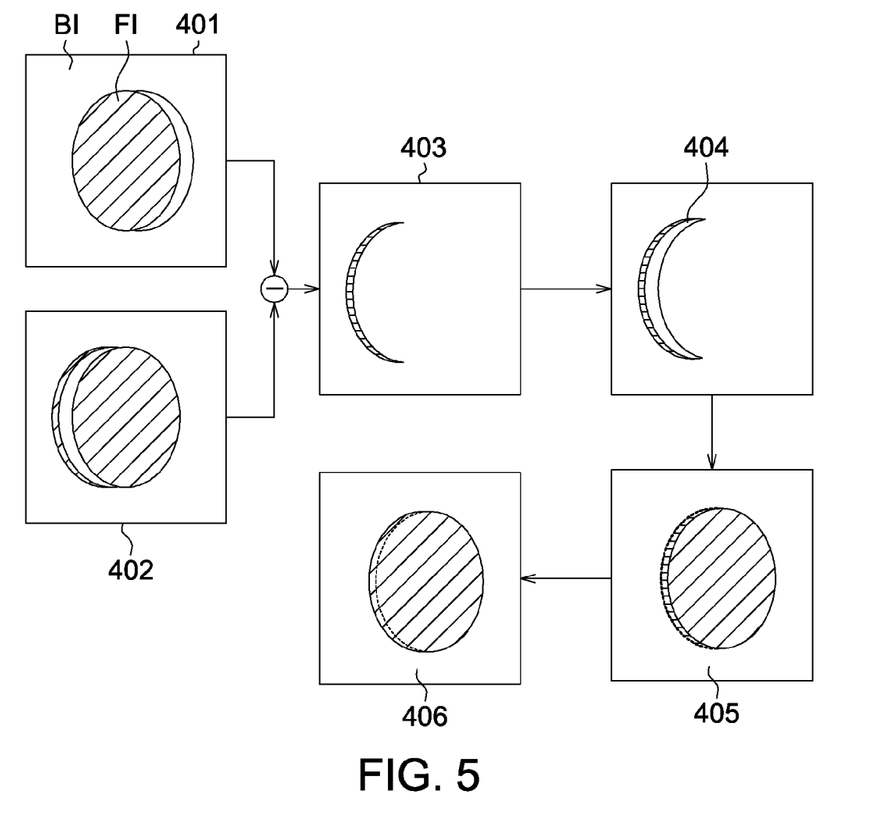
FIG. 5 is a schematic diagram of using the exemplary embodiment method of FIG. 3 to check the right side hole.

FIG. 5 shows a schematic diagram of using the exemplary embodiment method of FIG. 3 to check the right side hole. A residual difference DiffLRwarp 403 of the at least one pixel is obtained, by pixel to pixel which is not a hole, by subtracting pixel value of the left-virtual-view image 401 and the right-virtual-view image 402, and step 230 finds at least one pixel that having noise. When judging that the width of right-side hole 404 of a pixel is larger than the second threshold value during right-side hole checking (S240). The reverse warping of the pixel will be performed according to the information of the right-view image, and a warping coordinate of the real-view image from which this pixel is warped (S250) is obtained. In step S270 then obtaining the corrected right-view depth map 406, by aligning depth value of the pixel according to the depth value of one or more pixels of the left vicinity of the coordinate from the right-view depth map 405.

Referring to FIG. 3 again, in another exemplary embodiment, after reverse warping step S250, could choose to perform step S260. In step S260, obtaining one or more pixels to left direction &/right direction at the current pixel location of the left-side image &/right-side image, for example XB pixels are found and XB is a positive integer greater than or equal to one. When judging the depth values of the XB pixels are smaller than the depth value of current pixel. Performing the depth map aligning in step S270. The current pixel is judged to be the noise and the depth value of the current pixel is aligned using the depth value(s) of the foreground object.

After aligning the depth map of each possible pixel that may have noise, the aligned depth map of the left-view and/or right-view will be produced to be the source for further encoding compression process or view synthesis.

Figure 6:
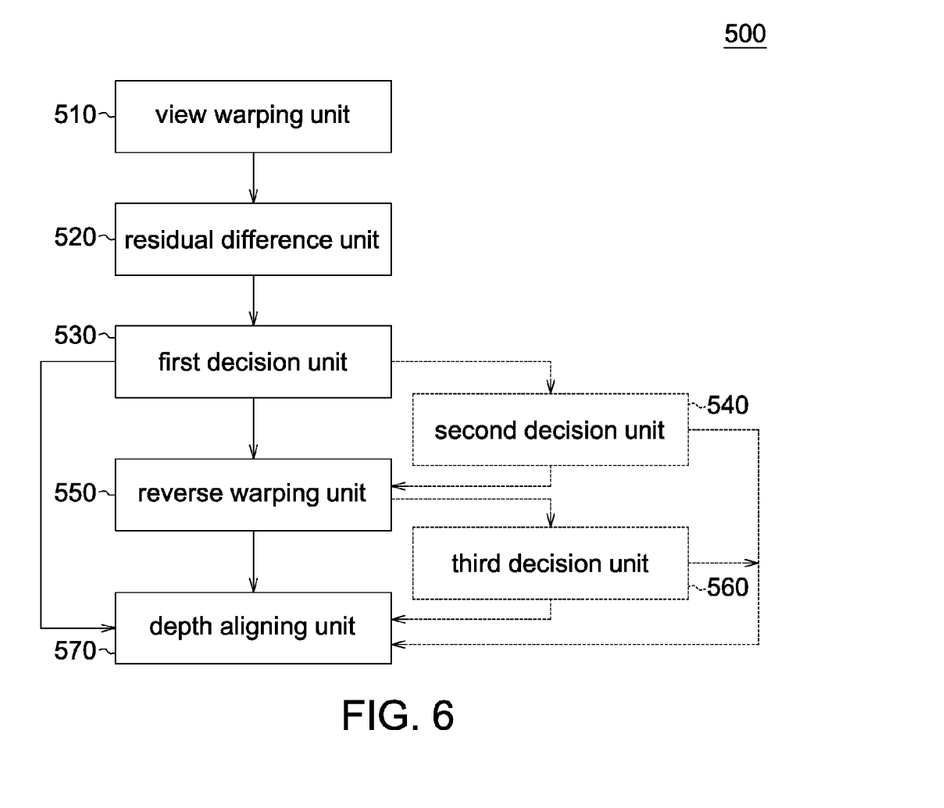
FIG. 6 is a block diagram showing a depth map aligning system according to an exemplary embodiment of the disclosure.

Referring to FIG. 6, an exemplary embodiment of a depth map aligning system 500 is disclosed in accordance with the disclosure, which may eliminate the noise of virtual-view image be produced. The system 500 includes a view warping unit 510, a residual difference unit 520, a first decision unit 530, a reverse warping unit 550 and a depth aligning unit 570. The view warping unit 510 obtains a left-virtual-view image, a right-virtual-view image, a left hole information, and a right hole information according to a corresponding depth map, and performs a view warping of a left-view image and a right-view image of a real-view image respectively. The left hole information include at least a number of left hole and the right hole information include at least a number of right hole. The residual difference unit 520 subtracts pixel value of the left-virtual-view image and the right-virtual-view image by pixel to pixel, and obtains a residual difference of at least one pixel, which is not a hole. When the first decision unit 530 judges if the residual difference of the at least one pixel is larger than a first threshold value then the reverse warping unit 550 will obtain a coordinate of the at least one pixel in the real-view image, and will perform the reverse warping. The depth map aligning unit 570 performs a depth map aligning by correcting the depth value of the at least one pixel according to the depth values of one or more pixels in an obtained vicinity of the coordinate and obtains the corresponding aligned depth map of left-view image and/or right-view image. The view warping unit 510, the residual difference unit 520, the first decision unit 530, the reverse warping unit 550 and the depth aligning unit 570, for example, could be a chip, a firmware, a circuit or a medium storage stores a plurality of program codes, but which is not limited in the disclosure.

When obtaining the at least one pixel that could have noise, an exemplary embodiment of the disclosure could further judging a left-side hole &/or a right-side hole, by a second decision unit 540, if the width of the left-side hole and/or right-side hole larger than the second threshold value. That is checking the number of left-side hole or right-side hole is large than the second threshold or not. The second decision unit 540, for example, could be a chip, a firmware, a circuit or a medium storage stores a plurality of program codes, but which is not limited in the disclosure. If the second threshold is smaller, a reverse warping of the pixel will be performed by the reverse warping unit 550 to obtain the coordinate of the pixel located in the real-view image. The depth map aligning unit 570 will then perform depth map aligning according to the depth value of one or more pixels in a vicinity of the coordinate obtained.

The aligning system 500 could further include a third decision unit 560. The third decision unit 560 obtains one or more pixels of the left vicinity range &/or right vicinity range, such as XB pixels and XB is an integer greater than 1, according to the current pixel location in the left-view image &/or right-view image after the reverse warping correspondingly. After obtaining the warping coordinate of the pixel located in the real-view image by the reverse warping unit 550, an exemplary embodiment could further judging if the depth value of a current pixel is larger than XB pixels or not by the third decision unit 560. The depth map aligning unit 570 will then perform depth map aligning according to the depth value of one or more pixels in a vicinity of the coordinate obtained. The third decision unit 560, for example, could be a chip, a firmware, a circuit or a medium storage stores a plurality of program codes, but which is not limited in the disclosure.

Furthermore, the depth map aligning system 500 in accordance with the disclosure could electrical connect/couple to a processor and at least one memory (now shown in the figure). Each unit of the aligning system 500 could send signal, message or data out by simple circuit/circuits or firmware that incorporate with the processor. Each unit incorporates with the processor could perform process/ processes also.

After the system 500 aligning the depth map of each possible pixel that may have noise, the aligned depth map of the left-view and/or right-view will be produced to be the source for further encoding compression process or view synthesis.

How to decide the value of first threshold? In some embodiments, the first threshold value could be an integer greater than 0. The bigger the first threshold value the less number of pixels will be taken as having noise. The possibility that the pixels having noise will be ignored will increase, without performing the depth map aligning which originally should be. But if the smaller the first threshold value set, it will become more sensitive to the noise. There will be more possibility that correct pixel(s) without noise could be changed inaccurately. The first threshold could then be called "noise sensitive threshold."

In general, the simplest way is defining the first threshold value to be a setting value, for example constant 3, 4, 5, 6, 7 . . . and so on. Furthermore, an arithmetic way could also be used to obtain the first threshold value. An exemplary embodiment could divide all of the residual difference DiffLRwarp of the at least one pixel into M×N blocks, M, N is positive integer. The arithmetic means, or a median, or a similar statistic character value of each of the blocks is obtained to form the first threshold for each block upon judging the pixel(s) of the block. There are other way like machine learning, could adjust the first threshold value till a favourable value is reach gradually.

When the distance of virtual view to be synthesised is farther, for example using the fifth real-view to synthesis the second virtual-view. In this situation, some of the hole(s) will not be produced at the cross-section of foreground and background. Usually this kind of hole is not that big, such that could use a threshold, the second threshold, screen the hole(s) to avoid misjudgement. The second threshold could also be called "object boundary hole threshold." An exemplary embodiment could define the second threshold value a setting value, for example a constant. Another exemplary embodiment could use equation (1) to define the second threshold value, and set the second threshold value as a positive integer greater than or equal to 1.

$$Th2 = \frac{1}{n} \times f \times b \times \left( \frac{1}{Z_{near}} - \frac{1}{Z_{far}} \right) \quad (1)$$

Th2 is the second threshold and related with the following parameters. The f is the focal length of camera. The b is the baseline distance that usually means the distance of two views, and in this equation it means the distance of virtual-view and real-view. The n is a defined positive integer. The 2D image will be transfer into 3D dimension when performing view warping. The nearest and farthest range of the 3D dimension is decided by two plans, near clipping distance $Z_{near}$ and far clipping distance $Z_{far}$. In general, the absolute value of these parameters will be taken.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A depth map aligning method, comprising:
    performing a view warping to a left-view image and a right-view image of a real-view image according to a corresponding depth map to obtain a left-virtual-view image, a right-virtual-view image, a left hole information, and a right hole information;
    obtaining by pixel to pixel a residual difference of at least one pixel, which is not a hole, by subtracting pixel value of the left-virtual-view image and the right-virtual-view image;
    performing a reverse warping to obtain a coordinate of the at least one pixel in the real-view image, if the residual difference of the at least one pixel is larger than a first threshold value; and
    performing a depth map aligning by correcting a depth value of the at least one pixel according to depth values of one or more pixels in a vicinity of the obtained coordinate.

2. The depth map aligning method according to claim 1, wherein the left hole information includes a number of left hole, and the step of performing the reverse warping further comprises:
    performing the reverse warping to obtain a warping coordinate in the left-view image, if the number of left hole of the at least one pixel is larger than a second threshold value.

3. The depth map aligning method according to claim 2, wherein after the reverse warping, the depth map aligning method further comprises:
    obtaining the one or more pixels of a left vicinity for a current pixel location of the left-view image; and
    performing the depth map aligning, if depth value of the current pixel is smaller than the depth value of each of the one or more pixels.

4. The depth map aligning method according to claim 2, further comprising:
    synthesizing a depth map of the left-virtual-view image by using the depth map of the left-view image to perform the reverse warping.

5. The depth map aligning method according to claim 2, further comprising:
    producing a left lookup table to perform the reverse warping, for each pixel of the left-virtual-view image, the left lookup table records a warping distance projected from the real-view image.

6. The depth map aligning method according to claim 2, wherein the second threshold value is a setting value.

7. The depth map aligning method according to claim 2, wherein the second threshold value is a positive integer greater than or equal to 1, and
    the second threshold value is $$\frac{1}{n} \times f \times b \times \left( \frac{1}{Z_{near}} - \frac{1}{Z_{far}} \right),$$

wherein f is a focal length of a camera, b is a baseline distance, n is a positive integer, $Z_{near}$ is a near clipping distance, and $Z_{far}$ is a far clipping distance.

8. The depth map aligning method according to claim 1, wherein the right hole information includes a plurality of right hole, and the step of performing the reverse warping further comprises:
    performing the reverse warping to obtain a warping coordinate in the right-view image, if the number of right hole of the at least one pixel is larger than a second threshold value.

9. The depth map aligning method according to claim 8, further comprises:
    synthesizing a depth map of the right-virtual-view image by using the depth map of the right-view image to perform the reverse warping.

10. The depth map aligning method according to claim 8, further comprising:
    producing a right lookup table to perform the reverse warping, for each pixel of the right-virtual-view image, the right lookup table records a warping distance projected from the real-view image.

11. The depth map aligning method according to claim 8, wherein after the reverse warping, the depth map aligning method further comprises:
    obtaining the one or more pixels of a right vicinity for a current pixel location of the right-view image; and
    performing the depth map aligning, if depth value of the current pixel is smaller than the depth value of each of the one or more pixels.

12. The depth map aligning method according to claim 8, wherein the second threshold value is a setting value.

13. The depth map aligning method according to claim 8, wherein the second threshold value is a positive integer greater than or equal to 1, and
the second threshold value is $$\frac{1}{n} \times f \times b \times \left(\frac{1}{Z_{near}} - \frac{1}{Z_{far}}\right),$$

wherein f is a focal length of a camera, b is a baseline distance, n is a positive integer, $Z_{near}$ is a near clipping distance, and $Z_{far}$ is a far clipping distance.

14. The depth map aligning method according to claim 1, wherein the vicinity of the coordinate includes a setting distance of a setting direction that surrounding the at least one pixel.

15. The depth map aligning method according to claim 14, wherein the depth value of the at least one pixel is corrected by obtaining a arithmetic mean or a median of the depth values of one or more pixels in the vicinity of the coordinate.

16. The depth map aligning method according to claim 1, wherein the first threshold is a setting value.

17. The depth map aligning method according to claim 1, further comprising:
dividing all of the residual difference of the at least one pixel into M×N blocks, wherein M and N are positive integers; and
obtaining an arithmetic mean or a median of each of the blocks to form the first threshold for each block.

18. The depth map aligning method according to claim 1, wherein after the reverse warping, the depth map aligning method further comprises:
obtaining the one or more pixels of a left vicinity for a current pixel location of the left-view image; and
performing the depth map aligning, if depth value of the current pixel is smaller than the depth value of each of the one or more pixels.

19. The depth map aligning method according to claim 1, wherein after the reverse warping, the depth map aligning method further comprises:
obtaining the one or more pixels of a right vicinity for a current pixel location of the right-view image; and
performing the depth map aligning, if depth value of the current pixel is smaller than the depth value of each of the one or more pixels.

20. The depth map aligning method according to claim 1, wherein the depth value of the at least one pixel is corrected by obtaining a arithmetic mean or a median of the depth values of one or more pixels in the vicinity of the coordinate.

21. A depth map aligning system, comprising:
a view warping unit for obtaining a left-virtual-view image, a right-virtual-view image, a left hole information, and a right hole information according to a corresponding depth map, and performing a view warping to a left-view image and a right-view image of a real-view image;
a residual difference unit for subtracting pixel value of the left-virtual-view image and the right-virtual-view image by pixel to pixel, to obtain a residual difference of at least one pixel, which is not a hole;
a first decision unit for determining whether the residual difference of the at least one pixel is larger than a first threshold value, wherein if the residual difference of the at least one pixel is larger than the first threshold value, then a reverse warping is performed;
a reverse warping unit for obtaining a coordinate of the at least one pixel in the real-view image, and performing the reverse warping; and
a depth map aligning unit for performing a depth map aligning by correcting a depth value of the at least one pixel according to depth values of one or more pixels in a vicinity of the coordinate obtained.

22. The depth map aligning system according to claim 21, wherein the left hole information includes a plurality of left hole, the right hole information includes a plurality of right hole, and system further performs the reverse warping to obtain a warping coordinate if the number of left hole or the number of right hole of the at least one pixel is larger than a second threshold value.

23. The depth map aligning system according to claim 22, further comprising:
a third decision unit for obtaining the one or more pixels of a right vicinity or a left vicinity for a current pixel location of the right-view image or left-view image respectively after performing the reverse warping and judging if depth value of the current pixel is smaller than the depth value of each of the one or more.

24. The depth map aligning system according to claim 21, further comprising:
a third decision unit, obtaining the one or more pixels of a right vicinity or a left vicinity for a current pixel location of the right-view image or left-view image respectively after performing the reverse warping and judging if depth value of the current pixel is smaller than the depth value of each of the one or more pixels.

25. The depth map aligning system according to claim 21, wherein the vicinity of the coordinate includes a setting distance of a setting direction that surrounds the at least one pixel.

26. The depth map aligning system according to claim 21, wherein the depth value of the at least one pixel is corrected by obtaining a arithmetic mean or a median of the depth value of one or more pixels in the vicinity of the coordinate.

* * * * *